United States Patent
Iida et al.

(10) Patent No.: US 11,163,117 B2
(45) Date of Patent: Nov. 2, 2021

(54) OPTICAL FIBER CABLE AND METHOD FOR MANUFACTURING THE SAME

(71) Applicant: ISHIHARA SANGYO CO., LTD., Ueda (JP)

(72) Inventors: Hidetoku Iida, Ueda (JP); Takushi Matsui, Ueda (JP); Satoru Tomaru, Ueda (JP)

(73) Assignee: ISHIHARA SANGYO CO., LTD., Ueda (JP)

( * ) Notice: Subject to any disclaimer, the term of this patent is extended or adjusted under 35 U.S.C. 154(b) by 0 days.

(21) Appl. No.: 16/766,899

(22) PCT Filed: Nov. 20, 2018

(86) PCT No.: PCT/JP2018/042843
§ 371 (c)(1),
(2) Date: May 26, 2020

(87) PCT Pub. No.: WO2019/102996
PCT Pub. Date: May 31, 2019

(65) Prior Publication Data
US 2020/0355870 A1   Nov. 12, 2020

(30) Foreign Application Priority Data
Nov. 27, 2017   (JP) .............................. JP2017-226476

(51) Int. Cl.
*G02B 6/25* (2006.01)
*G02B 6/255* (2006.01)

(52) U.S. Cl.
CPC .................. *G02B 6/2558* (2013.01)

(58) Field of Classification Search
CPC .................................................. G02B 6/2558
(Continued)

(56) References Cited

U.S. PATENT DOCUMENTS

| 4,585,304 A | 4/1986 | Winter et al. |
| 2004/0234208 A1* | 11/2004 | Yoshitani ............. G02B 6/3865 385/78 |

(Continued)

FOREIGN PATENT DOCUMENTS

| JP | 60-28712 U | 2/1985 |
| JP | 60-51514 U | 4/1985 |

(Continued)

OTHER PUBLICATIONS

International Search Report and Written Opinion dated Jan. 15, 2019 in PCT/JP2018/042843 filed on Nov. 20, 2018, 7 pages.

*Primary Examiner* — Jerry M Blevins
(74) *Attorney, Agent, or Firm* — Oblon, McClelland, Maier & Neustadt, L.L.P.

(57) ABSTRACT

To provide an optical fiber cable having a protective structure of an optical fiber connecting part that allows easy fabrication of a protective structure part having a decreased diameter without use of a metal rod and a heat-shrinkable tube, and a method for manufacturing the same. The problem is solved by an optical fiber cable (30) comprising a connecting part (3) of two optical fibers (10A, 10B), each configured by an optical fiber core wire (1) and a coating material (2) coating the optical fiber core wire (1), formed by peeling off the coating material (2) at tip end portions thereof, abutting tip ends of the optical fiber core wires (1) thus exposed against each other, and fusing and splicing the tip ends together, a resin cured product (4) provided to an outer periphery of the connecting part (3) to have an outer diameter that is the same or substantially the same as an outer diameter of a portion of the optical fiber provided with the coating material (2), a metal pipe (6) provided to an outer periphery of the resin cured product (4) with an adhesive layer (5) interposed therebetween, and an outer sheath (7)

(Continued)

composed of a resin tube or an extruded resin layer and covering an entire length including the metal pipe (6).

20 Claims, 3 Drawing Sheets

(58) Field of Classification Search
USPC .......................................................... 385/99
See application file for complete search history.

(56) References Cited

U.S. PATENT DOCUMENTS

| | | | |
|---|---|---|---|
| 2010/0158452 A1* | 6/2010 | Takahashi | G02B 6/2551 |
| | | | 385/96 |
| 2015/0198766 A1* | 7/2015 | Takahashi | G02B 6/2558 |
| | | | 385/78 |
| 2017/0322371 A1* | 11/2017 | Iwase | H01S 5/141 |

FOREIGN PATENT DOCUMENTS

| | | |
|---|---|---|
| JP | 60-73506 A | 4/1985 |
| JP | 9-159861 A | 6/1997 |
| JP | 2003-315596 A | 11/2003 |
| JP | 2008-181026 A | 8/2008 |
| JP | 2017-122829 A | 7/2017 |
| WO | WO 01/27673 A1 | 4/2001 |

* cited by examiner

OPTICAL FIBER CABLE AND METHOD FOR MANUFACTURING THE SAME

CROSS-REFERENCE TO RELATED APPLICATIONS

The present application is a 35 U.S.C. § 371 national stage patent application of International patent application PCT/JP2018/042843, filed on Nov. 20, 2018, which is based on and claims the benefits of priority to Japanese Application No. 2017-226476, filed on Nov. 27, 2017. The entire contents of these applications are incorporated herein by reference.

FIELD OF THE INVENTION

The present invention relates to an optical fiber cable and a method for manufacturing the same. More specifically, the present invention relates to an optical fiber cable having a protective structure of an optical fiber connecting part that allows easy fabrication of a protective structure part having a decreased diameter without use of a metal rod and a heat-shrinkable tube, and a method for manufacturing the same.

BACKGROUND ART

A connection between optical fibers is made by removing a coating material of the optical fibers, abutting optical fiber tip end surfaces against each other, and heating and fusing the tip end surfaces together. At the connecting part thus connected, the coating material is removed, exposing optical fiber core wires and weakening a mechanical strength. Therefore, various reinforcing means are applied. For example, a method of integrating by heating using a reinforcing material composed of a heat-shrinkable sleeve, a method of integrating by heating using a reinforcing material including a hot-melt adhesive, a method of integrating by a resin mold, a method of reinforcing by attaching a metal rod and subsequently covering an outside thereof with a heat-shrinkable tube, and the like are performed.

In the method of attaching a metal rod and subsequently covering an outside thereof with a heat-shrinkable tube, the problem arises that the metal rod increases a diameter around the connecting part. In order to solve this problem, Patent Document 1 proposes a method in which a metal rod is not used as a reinforcing material. Specifically, an ultraviolet curable adhesive is filled between a fusing and splicing part of the optical fibers and a heat-shrinkable tube or a resin tube and cured by irradiation with ultraviolet light, and the heat-shrinkable tube or the resin tube mounted so as to cover an outside of the fusing and splicing part of the optical fibers is shrunk by heating. With such a reinforcement method, the optical fiber fusing and splicing part can be reinforced without requiring a metal rod.

It should be noted that Patent Document 2 proposes a protective sleeve without residual air bubbles when heat-shrunk, moreover, with easy temperature control of a heater for heat-shrinking. This protective sleeve is a protective sleeve including, on a surface thereof, countless minute holes that facilitate air bubble escape, and is a heat-shrinkable tube inserted through an adhesive tube made of a hot-meltable resin inserting through a connecting part of optical fibers, and a tension member.

PATENT DOCUMENTS

Patent Document 1: Japanese Laid-Open Patent Application No. H09-159861
Patent Document 2: Japanese Laid-Open Patent Application No. 2008-181026

SUMMARY OF THE INVENTION

Problems to be Solved by the Invention

In the reinforcement method described in the above-described Patent Document 1, a rigid metal rod is not used, and thus the mechanical strength is far from sufficient. Therefore, the above-described Patent Document 2 proposes use of a metal rod as the tension member.

Nevertheless, when a metal rod is used as a reinforcing material, the problem still exists that the diameter around the connecting part increases. Further, when a heat-shrinkable tube is used, the problem arises that both end portions heat-shrink faster than a central portion due to local heating, causing the air to not escape and remain in an interior thereof, and the complexities exist such that a protective sleeve with holes such as in Patent Document 2 is used.

The present invention has been made to solve the above-described problems, and an object thereof is to provide an optical fiber cable having a protective structure of an optical fiber connecting part that allows easy fabrication of a protective structure part having a decreased diameter without use of a metal rod and a heat-shrinkable tube, and a method for manufacturing the same.

Means for Solving the Problems (1) An optical fiber cable according to the present invention comprises at least a connecting part of two optical fibers, each configured by an optical fiber core wire and a coating material coating the optical fiber core wire, formed by peeling off the coating material at tip end portions thereof, abutting tip ends of the optical fiber core wires thus exposed against each other, and fusing and splicing the tip ends together, a resin cured product provided to an outer periphery of the connecting part to have an outer diameter that is the same or substantially the same as an outer diameter of a portion of the optical fiber provided with the coating material, a metal pipe provided to an outer periphery of the resin cured product with an adhesive layer interposed therebetween, and an outer sheath composed of a resin tube or an extruded resin layer and covering an entire length including the metal pipe.

According to this invention, the resin cured product is provided to the outer periphery of the connecting part of the optical fibers, and a protective pipe (metal pipe) is provided to the outer periphery of the resin cured product with the adhesive layer interposed therebetween. Therefore, because a metal rod is not used, the diameter is not increased and, because a heat-shrinkable tube is not used, air bubbles do not remain in an interior thereof. As a result, it is possible to provide a protective structure of the optical fiber connecting part that allows easy fabrication of a protective structure part having a decreased diameter and further facilitates provision of the outer sheath, and a method for fabricating the same. In particular, the resin cured product is provided so as to have an outer diameter that is the same or substantially the same as the outer diameter of the portion of the optical fiber provided with the coating material, and thus the outer diameter of the connecting part provided with the resin cured product is about the same as the outer diameter of the optical fiber.

In the optical fiber cable according to the present invention, when the optical fiber is a polarization-plane maintaining optical fiber, a mark, a line, or a groove for aligning and connecting a stress applying part of the polarization-plane maintaining optical fiber is provided to the metal pipe. According to this invention, alignment and connection of a polarization-plane maintaining optical fiber and a light element is possible, and a direction of the stress applying part when the polarization-plane maintaining optical fiber is connected can be easily detected.

In the optical fiber cable according to the present invention, the resin cured product is a cured product made of an ultraviolet curable resin.

(2) A method for manufacturing an optical fiber cable according to the present invention comprises the steps of connecting two optical fibers, each configured by an optical fiber core wire and a coating material coating the optical fiber core wire, by peeling off the coating material at tip end portions thereof, abutting tip ends of the optical fiber core wires thus exposed against each other, and fusing and splicing the tip ends together, providing a resin cured product to an outer periphery of the connecting part of the optical fibers thus connected to have an outer diameter that is the same or substantially the same as an outer diameter of a portion of the optical fiber provided with the coating material, providing a metal pipe to an outer periphery of the resin cured product with an adhesive layer interposed therebetween, and covering an entire length including the metal pipe with an outer sheath composed of a resin tube or an extruded resin layer.

In the method for manufacturing an optical fiber cable according to the present invention, when the optical fiber is a polarization-plane maintaining optical fiber, a mark, a line, or a groove for aligning and connecting a stress applying part of the polarization-plane maintaining optical fiber is provided to the metal pipe.

Effect of the Invention

According to the present invention, it is possible to provide an optical fiber cable having a protective structure of an optical fiber connecting part that allows easy fabrication of a protective structure part having a decreased diameter without use of a metal rod and a heat-shrinkable tube, and a method for manufacturing the same.

EMBODIMENTS OF THE INVENTION

Figure 1:
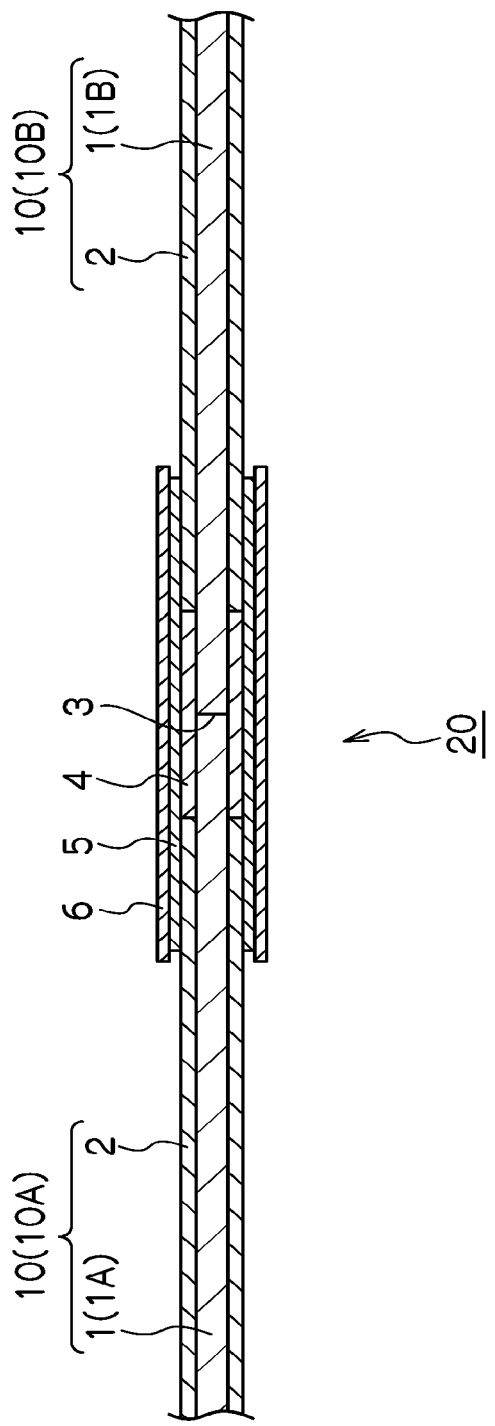
FIG. 1 is a longitudinal sectional view illustrating an example of an optical fiber cable (having a protective structure of a connecting part of optical fibers) according to the present invention.

An optical fiber cable and a method for manufacturing the same according to the present invention are described below with reference to the drawings. The present invention includes inventions having the same technical idea as that in the following embodiments and modes described in the drawings, and the technical scope of the present invention is not limited to only the descriptions of the embodiments and the descriptions of the drawings. It should be noted that, hereinafter, "protective structure of the optical fiber connecting part" of the optical fiber cable is simply referred to as "protective structure."

[Optical Fiber Cable]

Figure 2:
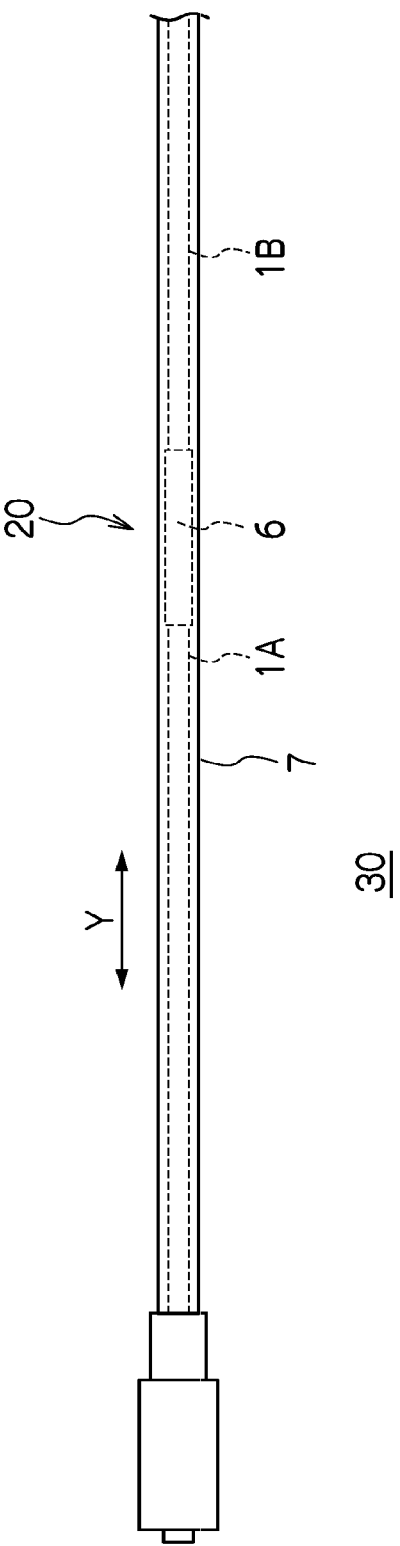
FIG. 2 is an external view illustrating an example in which an outer sheath is provided covering the protective structure illustrated in FIG. 1.

As illustrated in FIG. 1, an optical fiber cable 30 (having a protective structure 20 of an optical fiber connecting part) according to the present invention includes at least a connecting part 3 of optical fibers 10A, 10B, a resin cured product 4 provided to an outer periphery of the connecting part 3, and a protective pipe 6 provided to an outer periphery of the resin cured product 4 with an adhesive layer 5 interposed therebetween. As illustrated in FIG. 2, this protective structure 20 preferably further includes an outer sheath 7 covering a length Y including the protective pipe 6.

Specifically, the optical fiber cable 30 according to the present invention includes the connecting part 3 of the two optical fibers 10A, 10B, each configured by an optical fiber core wire 1 and a coating material 2 coating the optical fiber core wire 1, formed by peeling off the coating material 2 at tip end portions thereof, abutting tip ends of the optical fiber core wires 1 thus exposed against each other, and fusing and splicing the tip ends together, the resin cured product 4 provided to the outer periphery of the connecting part 3 to have an outer diameter that is the same or substantially the same as an outer diameter of a portion of the optical fiber provided with the coating material 2, the protective pipe (metal pipe) 6 provided to the outer periphery of the resin cured product 4 with the adhesive layer 5 interposed therebetween, and the outer sheath 7 composed of a resin tube or an extruded resin layer and covering the entire length including the protective pipe (metal pipe) 6.

A method for fabricating the protective structure 20 includes the steps of providing the resin cured product 4 to the outer periphery of the connecting part 3 of the optical fibers 10A, 10B thus connected, providing the protective pipe 6 to the outer periphery of the resin cured product 4 with the adhesive layer 5 interposed therebetween, and covering the length Y including the protective pipe 6 with the outer sheath 7.

With such a protective structure 20, the resin cured product 4 is provided to the outer periphery of the connecting part 3 of the optical fibers 10A, 10B, and the protective pipe 6 is provided to the outer periphery of the resin cured product 4 with the adhesive layer 5 interposed therebetween. Therefore, because a metal rod is not used, the diameter is not increased and, because a heat-shrinkable tube is not used, air bubbles do not remain in an interior thereof. As a result, there is an advantage of allowing easy fabrication of the protective structure part 20 (denoted using the same reference numeral 20 as that of the protective structure) having a decreased diameter and further facilitating provision of the outer sheath 7.

The optical fiber cable 30 according to the present invention is described in detail below.

(Optical Fiber Connecting Part)

The optical fiber connecting part 3 is a connecting part of the optical fibers 10A, 10B. Connection of the optical fibers 10A, 10B is made by removing the coating material 2 of the optical fibers 10 at the tip end portions, abutting tip ends of the optical fiber core wires 1 (1A, 1B) thus exposed against each other, and heat-fusing the tip ends together. That is, the optical fiber connecting part 3 is the connecting part 3 of the two optical fibers, each configured by the optical fiber core wire 1 and the coating material 2 coating the optical fiber core wire 1, formed by peeling off the coating material 2 at tip end portions thereof, abutting the tip ends of the optical fiber core wires 1 thus exposed against each other, and fusing and splicing the tip ends together. Types of the two optical fibers 10A, 10B to be connected are not particularly limited, and the two may be optical fibers having the same outer diameter or optical fibers having different outer diameters. Further, the two may be single-mode optical fibers, polarization-plane maintaining optical fibers (polarization-maintaining and absorption-reducing fibers; PANDA fibers), or a single-mode optical fiber and a polarization-plane maintaining optical fiber to be connected to each other. Further, the optical fibers having different core diameters may be connected after core diameter expansion to the same or substantially the same diameter by thermal diffusion.

A material of the optical fiber is not particularly limited as long as the material can be fused and spliced, and examples thereof include a quartz fiber and the like. An outer diameter of the optical fiber is also not particularly limited and, for example, an optical fiber having a diameter of about 0.08 mm to 0.14 mm is preferably applied. A temperature at the time of fusing and splicing is selected as desired in correspondence with the material of the optical fiber. A type of the coating material 2 to be removed before heating and fusion is also not particularly limited, and examples thereof include a general ultraviolet curable resin and the like. Removal of the coating material 2 is also selected in correspondence with the type thereof, but removal can be performed by means such as a mechanical stripper or a stripper having a fiber coating and heating function, for example.

(Resin Cured Product)

The resin cured product 4 is provided to the outer periphery of the connecting part 3 and acts to reinforce the connecting part 3 in which the optical fiber core wires 1A, 1B are exposed and a mechanical strength is weakened with the optical fibers connected to each other. The resin cured product 4, while not particularly limited, is preferably a cured product made of an ultraviolet curable resin. It should be noted that examples of the ultraviolet curable resin include an ultraviolet curable urethane acrylate resin, an ultraviolet curable acrylic resin, an ultraviolet curable epoxy resin, and the like.

The resin cured product 4, as illustrated in FIG. 1, is provided so as to replace the peeled coating material 2 and reinforces the connecting part 3. Accordingly, an outer diameter of the resin cured product 4 is preferably the same or substantially the same as the outer diameter of the optical fiber 10 provided with the coating material 2. That is, the resin cured product 4 is preferably provided to the outer periphery of the connecting part 3 to have the same or substantially the same outer diameter as the outer diameter of a portion of the optical fiber 10 provided with the coating material 2. While the method for providing the resin cured product 4 is not particularly limited, two molds processed to dimensions capable of providing the resin cured product 4 at substantially the same outer diameter as the outer diameter of the optical fiber 10 provided with the coating material 2 are preferably used. Preferably, the molds are two combined molds, each including a semicircular groove, and the connecting part 3 is installed in the semicircular grooves of the two combined molds and cured using an ultraviolet curable resin. It should be noted that, after curing, the two combined molds are removed, and the connecting part 3 coated with the resin cured product 4 on an outer periphery thereof is extracted.

(Protective Pipe)

The protective pipe 6 is provided to the outer periphery of the resin cured product 4 with the adhesive layer 5 interposed therebetween. The protective pipe 6 is preferably a metal pipe, and a stainless steel pipe can be preferably used. While an inner diameter of the protective pipe 6 is larger than an outer diameter after the resin cured product 4 is provided, the clearance need only be sufficient for providing the adhesive layer 5. The protective pipe 6 is a strong metal pipe and thus a thickness of the protective pipe 6 can be reduced as described in the section "Diameter decrease of protective structure part" described later. As a result, the outer diameter after the protective pipe 6 is provided can be decreased.

Further, preferably a mark, a line, or groove is provided to the protective pipe 6. This makes it possible to, for example, easily detect a direction of a stress applying part when the polarization-plane maintaining optical fiber is connected, and thus is convenient for alignment and connection with a light element. That is, when the optical fiber 10 is a polarization-plane maintaining optical fiber, preferably a mark, a line, or a groove for aligning and connecting a stress applying part of the polarization-plane maintaining optical fiber is provided to the protective pipe (metal pipe) 6.

It should be noted that the adhesive layer 5 is provided between the resin cured product 4 and the protective pipe 6. The adhesive layer 5, while not particularly limited as long as various adhesives are used, is preferably a curable resin such as a thermosetting epoxy resin or a normal-temperature curable epoxy resin. After such an adhesive is provided on the resin cured product 4, the protective pipe 6 is slid to a position of the resin cured product 4 and adhered. Thus, the protective structure 20 can be fabricated.

(Outer Sheath)

The outer sheath 7, as illustrated in FIG. 2, covers a length Y including the protective pipe 6. That is, the outer sheath 7 can be composed of a resin tube or an extruded resin layer and covering an entire length including the protective pipe (metal pipe) 6. As the outer sheath 7, a resin tube having a constant inner diameter can be used. When such a resin tube is used as the outer sheath 7, an optical fiber having the protective structure 20 according to the present invention can be inserted into the outer sheath 7 to obtain the optical fiber cable 30. Further, as the outer sheath 7, an extruded resin layer is also applicable. When such an extruded resin layer is used as the outer sheath 7, the optical fiber cable 30 in which an extruded resin layer having a constant outer diameter is provided on an optical fiber having the protective structure 20 according to the present invention can be obtained. It should be noted that, while the material of the resin tube is not particularly limited, examples thereof include a polyester elastomer, a polyamide resin, a polytetrafluoroethylene resin, and the like. Further, while the material of the extruded resin layer is also not particularly limited, examples thereof include a polyester elastomer, a polyamide resin, and the like.

A thickness of the outer sheath 7, while not particularly limited, can be, for example, about 0.1 mm to 0.5 mm. An inner diameter of the outer sheath 7, while also not particularly limited, may be an inner diameter such as having a slight clearance from the outer diameter after the protective pipe 6 is provided, thereby making it possible to decrease a total outer diameter of the optical fiber cable 30.

(Diameter Decrease of Protective Structure Part)

Figure 3A:
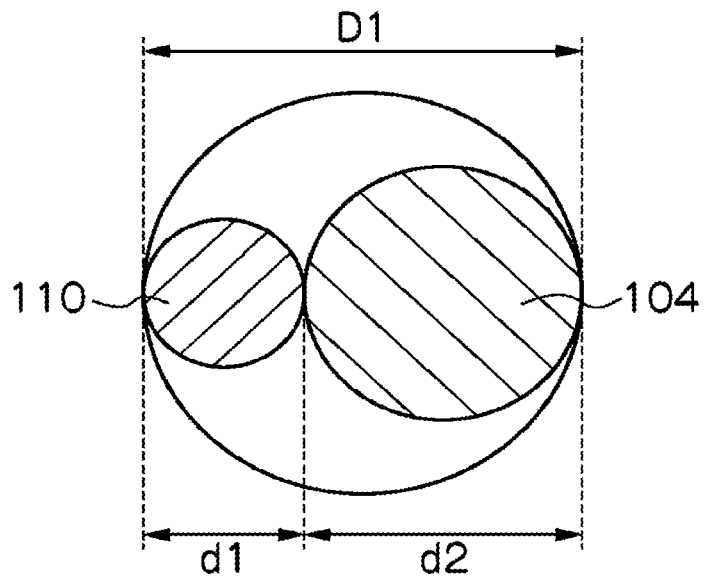
FIG. 3A is a cross-sectional view illustrating an example of a conventional protective structure with a metal rod attached.
Figure 3B:
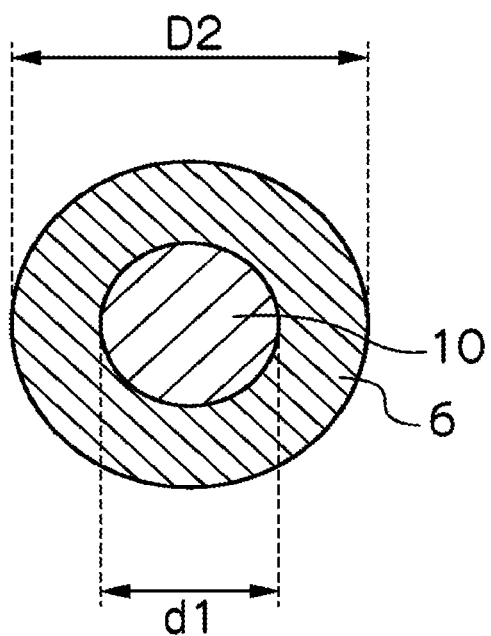
FIG. 3B is a cross-sectional view illustrating an example of the protective structure of the present invention that uses a metal pipe.
Figure 4:
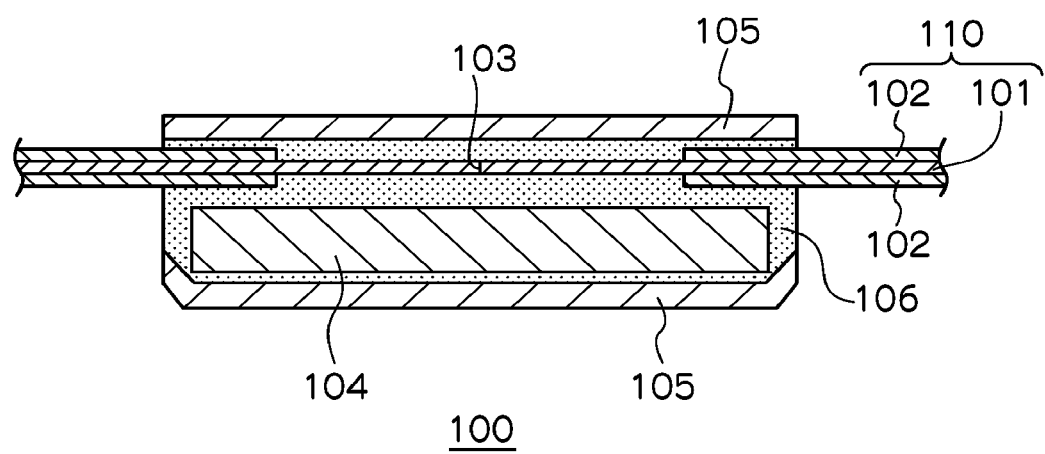
FIG. 4 is a longitudinal sectional view illustrating a conventional example of a reinforcing structure of the connecting part of the optical fibers.

FIG. 3A is a cross-sectional view illustrating an example of a conventional protective structure with a metal rod 104 attached to a connecting part 103. FIG. 3B is a cross-sectional view illustrating an example of the protective structure of the present invention that uses a metal pipe as the protective pipe 6. Further, FIG. 4 is a longitudinal sectional view illustrating a conventional example of a reinforcing structure 100 of a connecting part of optical fibers 110. The conventional reinforcing structure 100 illustrated in FIG. 4 is obtained by fusing and splicing tip ends of optical fiber core wires 101 from which a coating material 102 has been removed, disposing the metal rod 104 along the connecting part 103 thus connected, covering an outside thereof with a heat-shrinkable tube 105, filling the heat-shrinkable tube 105 with a hot-melt adhesive 106, and applying heat to melt and integrate these and thus achieve reinforcement.

In FIGS. 3A and 3B, d1 is an outer diameter of the optical fiber, d2 is an outer diameter of the metal rod, D1 is an outer diameter of a circumscribed circle of d1 and d2, and D2 is an outer diameter of the metal pipe. The relationship between the outer diameters illustrated in FIGS. 3A and 3B is represented by the formulas below. As understood from the formulas below and FIGS. 3A and 3B, when cross-sectional areas of metal portions are set to the same in order to obtain the same strength, D1>D2 and the outer diameter D2 of the protective structure 20 according to the present invention can be significantly smaller (thinner) than the outer diameter D1 of the conventional reinforcing structure 100.

[Formula 1]

Specifically, when stainless steel is used as a tensile strength member, an elastic modulus thereof is approximately $200 \times 10^3$ MPa. In a case in which a tensile strain of 0.1% or less is desired when a force of 5 N is applied to the protective structure part, the cross-sectional area of the stainless steel is 0.126 mm² based on $E = \sigma/\varepsilon$. For example, when the metal rod 104 (stainless steel rod) having the form illustrated in FIG. 3A and FIG. 4 is used to reinforce the optical fiber 10 having an outer diameter of 0.25 mm, including the coating material 2, a stainless steel rod having a diameter of at least 0.4 mm or more needs to be attached to the connecting part of the optical fiber. On the other hand, when the protective pipe 6 (stainless steel pipe) having the form illustrated in FIG. 1 and FIG. 3B is used, a stainless steel pipe having an outer diameter of 0.5 mm and an inner diameter of 0.3 mm, which allows the optical fiber 10 having an outer diameter of 0.25 mm, including the covering material 2, to pass therethrough, is sufficient. To apply 0.1% tensile strain to a stainless steel pipe having this size requires a force of as much as 24 N, and the tensile strain when a force of 5 N is applied to the protective structure part as described above can be 0.1% or less.

Accordingly, in the protective structure 20 according to the present invention, which has a decreased diameter, a resin tube having an outer diameter of 0.9 mm and an inner diameter of 0.55 mm, for example, is made to cover the protective pipe 6 as the outer sheath 7, thereby making it possible to make the dimensions the same as those of an optical fiber cable typically sold and achieve a significant decrease in diameter. This makes it possible to achieve the optical connector illustrated in FIG. 2 by using a general-purpose optical connector parts.

The optical fiber cable 30 obtained as described above can be decreased in total outer diameter as illustrated in FIG. 2 and FIG. 3B, unlike a case in which a metal rod is vertically attached to the connecting part (refer to FIG. 3A and FIG. 4 described later). Furthermore, because only the protective structure part 20 around the connecting part does not become expanded, the protective structure part 20 can be made inconspicuous. Moreover, a heat-shrinkable tube is not used, and thus the problem does not arise that both end portions heat-shrink faster than a central portion due to local heating, causing the air to not escape, and air bubbles do not remain in an interior thereof. As a result, the protective structure part 20 having a decreased diameter can be easily fabricated.

Further, as main modes, the optical fiber cable 30 according to the present invention connects optical fiber cables having the same or different outer diameters, connects polarization-plane maintaining optical fibers, or connects a single-mode optical fiber and a polarization-plane maintaining optical fiber. Then, only one protective pipe (metal pipe) 6 is provided. Such a present invention differs from the prior art having a rigid connecting structure (a structure form in which two metal pipes are provided overlapping each other) for the purpose of repairing and coupling a damaged optical fiber cable.

(Method for Manufacturing Optical Fiber Cable)

A method for manufacturing the optical fiber cable 30 according to the present invention is a method for manufacturing an optical fiber cable having the protective structure 20 of the optical fiber connecting part, and includes the steps of providing the resin cured product 4 to the outer periphery of the connecting part 3 of the optical fibers 10A, 10B thus connected, providing the protective pipe 6 to the outer periphery of the resin cured product 4 with the adhesive layer 5 interposed therebetween, and covering the length Y including the protective pipe 6 with the outer sheath 7.

Specifically, the method for manufacturing the optical fiber cable 30 according to the present invention includes the steps of connecting two optical fibers 10A, 10B, each configured by the optical fiber core wire 1 and the coating material 2 coating the optical fiber core wire 1, by peeling off the coating material 2 at tip end portions thereof, abutting tip ends of the optical fiber core wires 1 thus exposed against each other, and fusing and splicing the tip ends together, providing the resin cured product 4 to the outer periphery of the connecting part 3 of the optical fibers 10A, 10B thus connected to have an outer diameter that is the same or substantially the same as the outer diameter of the portion of the optical fiber provided with the coating material 2, providing the protective pipe (metal pipe) 6 to the outer periphery of the resin cured product 4 with the adhesive layer 5 interposed therebetween, and covering the entire length including the protective pipe (metal pipe) 6 with the outer sheath 7 composed of a resin tube or an extruded resin layer.

The contents of each step constituting this manufacturing method are described in the explanations of each of the components described above, and thus descriptions thereof are omitted here.

DESCRIPTIONS OF REFERENCE NUMERALS

1 Optical fiber core wire
1A First optical fiber core wire

1B Second optical fiber core wire
2 Coating material
3 Connecting part
4 Resin cured product
5 Adhesive layer
6 Protective pipe (Metal pipe)
7 Outer sheath (Protective outer layer)
10 Optical fiber
11 Peeled portion of coating material
20 Protective structure of connecting part (Protective structure part)
30 Optical fiber cable
Y Length
d1 Outer diameter of optical fiber
d2 Outer diameter of metal rod
D1 Outer diameter of circumscribed circle of d1 and d2
D2 Outer diameter of metal pipe
100 Conventional reinforcing structure
101 Optical fiber core wire
102 Coating material
103 Connecting part
104 Metal rod
105 Heat-shrinkable tube
106 Hot-melt adhesive
110 Optical fiber

What is claimed is:

1. An optical fiber cable, comprising:
    two optical fibers each comprising an optical fiber core wire and a coating material coating the optical fiber core wire, the two optical fibers being connected at a connecting part formed by peeling off the coating material at a tip end portion of each of the optical fibers such that a tip end of the optical fiber core wire is exposed, abutting the exposed tip ends of the optical fiber core wires against each other, and fusing and splicing the tip ends;
    a resin cured product covering an outer periphery of the connecting part such that the connecting part having the resin cured product has an outer diameter that is the same or substantially the same as an outer diameter of a portion of the optical fiber having the coating material;
    a metal pipe covering an outer periphery of the resin cured product such that an adhesive layer is interposed between the metal pipe and the resin cured product; and
    an outer sheath comprising a resin tube or an extruded resin layer and covering an entire length of the optical fiber cable including the metal pipe,
    wherein the optical fiber cable does not comprise a heat-shrinkable tube covering the connecting part.

2. The optical fiber cable according to claim 1, wherein the optical fiber is a polarization-plane maintaining optical fiber, and the metal pipe has a mark, a line, or a groove for aligning and connecting a stress applying part of the polarization-plane maintaining optical fiber.

3. The optical fiber cable according to claim 2, wherein the resin cured product is a cured product made of an ultraviolet curable resin.

4. The optical fiber cable according to claim 3, wherein the ultraviolet curable resin is selected from the group consisting of an ultraviolet curable urethane acrylate resin, an ultraviolet curable acrylic resin, and an ultraviolet curable epoxy resin.

5. The optical fiber cable according to claim 1, wherein the resin cured product is a cured product of an ultraviolet curable resin.

6. The optical fiber cable according to claim 5, wherein the ultraviolet curable resin is selected from the group consisting of an ultraviolet curable urethane acrylate resin, an ultraviolet curable acrylic resin, and an ultraviolet curable epoxy resin.

7. The optical fiber cable according to claim 1, wherein the metal pipe is a stainless steel pipe.

8. The optical fiber cable according to claim 1, wherein the optical fiber cable does not comprise a metal rod attached to the connecting part.

9. The optical fiber cable according to claim 1, wherein the resin tube or the extruded resin layer of the outer sheath comprises a polyester elastomer, a polyamide resin, or both.

10. The optical fiber cable according to claim 1, wherein the outer sheath has an outer diameter of 0.9 mm.

11. A method for manufacturing an optical fiber cable, comprising:
    connecting two optical fibers each comprising an optical fiber core wire and a coating material coating the optical fiber core wire, by peeling off the coating material at a tip end portion of each of the optical fibers such that a tip end of the optical fiber core wire is exposed, abutting the exposed tip ends of the optical fiber core wires against each other, and fusing and splicing the tip ends, thereby forming a connecting part of the two optical fibers;
    covering an outer periphery of the connecting part with a resin cured product such that the connecting part having the resin cured product has an outer diameter that is the same or substantially the same as an outer diameter of a portion of the optical fiber having the coating material;
    covering an outer periphery of the resin cured product with a metal pipe such that an adhesive layer is interposed between the metal pipe and the resin cured product; and
    covering the metal pipe with an outer sheath comprising a resin tube or an extruded resin layer such that the metal pipe covers an entire length of an optical fiber cable,
    wherein the optical fiber cable does not comprise a heat-shrinkable tube covering the connecting part.

12. The method according to claim 11, wherein
    the optical fiber is a polarization-plane maintaining optical fiber, and the metal pipe has a mark, a line, or a groove for aligning and connecting a stress applying part of the polarization-plane maintaining optical fiber.

13. The method according to claim 11, wherein the resin cured product is a cured product of an ultraviolet curable resin.

14. The method according to claim 13, wherein the ultraviolet curable resin is selected from the group consisting of an ultraviolet curable urethane acrylate resin, an ultraviolet curable acrylic resin, and an ultraviolet curable epoxy resin.

15. The method according to claim 11, wherein the covering of the outer periphery of the connecting part with the resin cured product comprises covering the outer periphery of the connecting part with an ultraviolet curable resin and curing the ultraviolet curable resin.

16. The method according to claim 11, wherein the metal pipe is a stainless steel pipe.

17. The method according to claim 11, wherein the optical fiber cable does not comprise a metal rod attached to the connecting part.

18. The method according to claim 11, wherein the resin tube or the extruded resin layer of the outer sheath comprises a polyester elastomer, a polyamide resin, or both.

19. An optical fiber cable, comprising:
two optical fibers each comprising an optical fiber core wire and a coating material coating the optical fiber core wire, the two optical fibers being connected at a connecting part formed by peeling off the coating material at a tip end portion of each of the optical fibers such that a tip end of the optical fiber core wire is exposed, abutting the exposed tip ends of the optical fiber core wires against each other, and fusing and splicing the tip ends;
a resin cured product covering an outer periphery of the connecting part such that the connecting part having the resin cured product has an outer diameter that is the same or substantially the same as an outer diameter of a portion of the optical fiber having the coating material;
a metal pipe covering an outer periphery of the resin cured product such that an adhesive layer is interposed between the metal pipe and the resin cured product; and
an outer sheath comprising a resin tube or an extruded resin layer and covering an entire length of the optical fiber cable including the metal pipe,
wherein the optical fiber is a polarization-plane maintaining optical fiber, and
the metal pipe has a mark, a line, or a groove for aligning and connecting a stress applying part of the polarization-plane maintaining optical fiber.

20. A method for manufacturing an optical fiber cable, comprising:
connecting two optical fibers each comprising an optical fiber core wire and a coating material coating the optical fiber core wire, by peeling off the coating material at a tip end portion of each of the optical fibers such that a tip end of the optical fiber core wire is exposed, abutting the exposed tip ends of the optical fiber core wires against each other, and fusing and splicing the tip ends, thereby forming a connecting part of the two optical fibers;
covering an outer periphery of the connecting part with a resin cured product such that the connecting part having the resin cured product has an outer diameter that is the same or substantially the same as an outer diameter of a portion of the optical fiber having the coating material;
covering an outer periphery of the resin cured product with a metal pipe such that an adhesive layer is interposed between the metal pipe and the resin cured product; and
covering the metal pipe with an outer sheath comprising a resin tube or an extruded resin layer such that the metal pipe covers an entire length of an optical fiber cable,
wherein the optical fiber is a polarization-plane maintaining optical fiber, and
the metal pipe has a mark, a line, or a groove for aligning and connecting a stress applying part of the polarization-plane maintaining optical fiber.

* * * * *